United States Patent Office 2,847,293
Patented Aug. 12, 1958

2,847,293

PLANT GROWTH CONTROL AND HERBICIDAL COMPOSITION AND PROCESS OF USING THE SAME

Linden E. Harris, Portland, Oreg., Vernon L. Hall, Palo Alto, Calif., and Frank J. Seibert, Bound Brook, and Irvin W. Bales, Westfield, N. J., assignors to Chipman Chemical Company, Inc., Bound Brook, N. J., a corporation of New York No Drawing. Application May 23, 1955
Serial No. 510,508

16 Claims. (Cl. 71—2.4)

This invention relates to plant growth control composition, and more particularly to weed control and herbicidal compositions consisting essentially of an N-aryl urea and an alkali metal chlorate, and to a process for controlling weeds and other plants by application of such a composition.

Weed control involves reduction of the weed stand sufficiently to prevent serious competition of weeds with the desired plants. The amount of control that is obtained is usually a balance between the costs involved in the control and the amount of injury that the weeds and the weed control chemicals may do to the crop. For most purposes, and with most crops, good control of the weeds is considered adequate. Complete removal or extermination of the weed species after it has once infested the land is usually too costly. It is however, capable of achievement if a sufficient amount of the weed control chemicals is used, and if the control chemicals are also soil sterilizers such amounts probably will serve to prevent contamination of the area by the weed species for some time.

A weed control chemical useful for eradication, prevention, and weed control should kill the plant tissues so as to eliminate the present weed stand and at the same time sterilize the soil so as to make it incapable of supporting plant growth. Sterilization usually is of a temporary nature and has to be renewed at periodic intervals. Sodium chlorate is a well known weed control chemical for deep-rooted and leafy plants, such as buckhorn plantain, yellow star thistle, wild morning glory (bindweed), Canada thistle, and sweetclover, useful as a contact herbicide and also acting as a soil sterilant. Because of its oxidizing characteristics it usually is used in conjunction with a diluent such as a pentaborate or a metaborate. Sodium chlorate is not too effective against the fairly shallow-rooted perennial grasses and annual seedling regrowth, due to rapid leaching of the chlorate from the surface.

Herbicidal compositions comprising N-aryl ureas are known to be effective against obnoxious grasses, i. e., nut grass, wild oats, Johnson grass, Bermuda grass, common foxtail, white stem filaree, quack grass, common barley and darnel. However, relatively high application rates are necessary for control. These ureas are not very effective against deep-rooted and leafy plants.

In accordance with the invention, an N-aryl urea is combined with an alkali metal chlorate to give a herbicidal combination which is more effective against both grasses and deep-rooted and leafy plants than either herbicide alone. This enhanced effectiveness is surprising, inasmuch as the chlorates and N-aryl ureas are not equally effective against the same plants.

While any amount of alkali metal chlorate will improve the effectiveness of the N-aryl urea, and vice versa, it is generally preferred that the combination thereof in accordance with the invention comprise from 0.5% to 10% of the N-aryl urea, the remainder being alkali metal chlorate, blended if desired with a hygroscopic or fire-retardant diluent to reduce fire hazard, such as an alkali metal metaborate or pentaborate.

The N-aryl ureas employed in the compositions of the invention are defined by the formula:

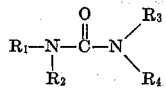

wherein $R_1$ is an aromatic radical which may have from one to five substituents which can be halogen, lower alkyl groups of up to eight carbon atoms, or nitro groups, and $R_2$, $R_3$ and $R_4$ each are selected from the group consisting of hydrogen and aliphatic hydrocarbon radicals having from one to three carbon atoms, and not more than two of $R_2$, $R_3$ and $R_4$ is hydrogen.

Although the invention embraces ureas containing aromatic radicals with and without halogen, alkyl and nitro substituents, and particularly those having from one to two aromatic nuclei, such as phenyl, tolyl, xylyl, diphenyl, and naphthyl, there are certain ureas of the invention which are especially attractive from a practical standpoint. Because of availability of raw materials and ease of manufacture, together with relatively high efficiency, ureas of the invention containing a phenyl radical having no more than two substituents, e. g. halogen, nitro and lower alkyl groups of one to eight carbon atoms, are preferred. Thus, $R_1$ in the previously-described formula can be phenyl, halogenophenyl, alkylphenyl, e. g., tolyl, xylyl, etc., and nitrophenyl. The halogens can be fluorine, chlorine, bromine or iodine. Higher cost and somewhat lower activity of ureas having an alkyl radical instead of hydrogen on the nitrogen atom bearing the aromatic radical makes these types of ureas of lesser importance. Thus, ureas having hydrogen on the nitrogen atom bearing the aromatic radical are preferred.

The following are typical:

3-(p-chlorophenyl)-1,1,3-trimethyl urea
3-(p-chlorophenyl)-1,1-dimethyl urea
3-(m-fluorophenyl)-1,1-dimethyl urea
3-(p-chlorophenyl)-1,3-dimethyl urea
3-(o-chlorophenyl)-1,1-diethyl urea
3-(p-chlorophenyl)-1,3-diethyl urea
3-(m-fluorophenyl)-1,1-dimethyl urea
3-(o-chlorophenyl)-1,1-dimethyl urea
3-(o-chlorophenyl)-1,1-diisopropyl urea
3-(m-chlorophenyl)-1,1-dimethyl urea
3-(m-chlorophenyl)-1,3-diethyl urea
3-(m-chlorophenyl)-1,1-diisopropyl urea
3-(m-chlorophenyl)-1,3-dimethyl urea
3-(p-chlorophenyl)-1,1-diisopropyl urea
3-(p-chlorophenyl)-1-methyl-1-ethyl urea
3-(p-chlorophenyl)-1,3-diethyl urea
3-(p-chlorophenyl)-1,1-diallyl urea
3-(3,4-dichlorophenyl)-1,1-dimethyl urea
3-(2,4,6-trichlorophenyl)-1,1-diethyl urea
3-(2,4,6-trichlorophenyl)-1,1-dimethyl urea 3-(2,4,6-trichlorophenyl)-1,3-dimethyl urea
3-(4-chloro-1-naphthyl)-1,1-dimethyl urea
3-(p-bromophenyl)-1,1-dimethyl urea
3-(p-bromophenyl)-1,1-diethyl urea
3-(p-iodophenyl)-1,1-dimethyl urea
3-(p-iodophenyl)-1,1-diethyl urea
3-(p-iodophenyl)-1,1-diisopropyl urea
3-phenyl-1,3-dimethyl urea
3-phenyl-1,1,3-trimethyl urea
3-phenyl-1,1-dimethyl urea
3-phenyl-1-isopropyl urea
1-(2-naphthyl)-3,3-dimethyl urea
1-(p-nitrophenyl)-3,3-diethyl urea
1-(p-tolyl)-3,3-dimethyl urea 3-(p-chlorophenyl)-1,1-dimethyl urea is especially preferred. This compound is called CMU in the trade.

These compounds can be prepared from the corresponding isocyanate, RNCO, or carbamyl chloride, $R'R''N\text{—COCl}$, R, R' and R'' being one of $R_1$, $R_2$, $R_3$ and $R_4$, with primary and secondary amines, $RNH_2$ and $R'R''NH$, where R, R' and R'' are either $R_1$, $R_2$ or $R_3$, $R_4$.

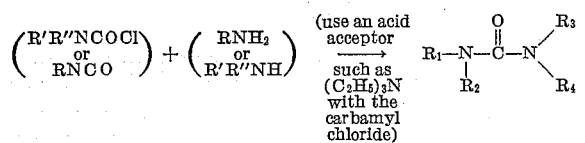

Utilizing p-chlorophenyl isocyanate and dimethyl amine, 3-(p-chlorophenyl)-1,1-dimethyl urea is obtained.

The reaction mixture can be heated to a temperature within the range of 0 to 100° C., preferably 25 to 75° C. The isocyanate or carbamyl chloride can be added dropwise to the amine, preferably in a 10 to 20% molal excess, dissolved or suspended in an inert solvent such as dry dioxane or dry benzene, and the reaction is continued until complete, usually within two hours or less. See U. S. Patent No. 2,704,245 to Searle, issued March 15, 1955. The aryl isocyanates can be prepared by the general methods described in Bull. soc. chim., iii, 21, 586, 954 (1899), Organic Syntheses, Collective Volume II, page 453, and U. S. Patent No. 2,428,843.

The other active herbicide of the combination is the chlorate, and for this purpose any water-soluble alkali metal chlorate is suitable, sodium and potassium chlorates being preferred. The combinations with the chlorate can be made in any desired manner. However, as is well known, sodium and potassium chlorates are highly active oxidizing materials, and therefore it is desirable to blend the chlorate according to known procedures with from 55 to 90% of a water-soluble material known to reduce the fire hazard, such as a hygroscopic material or a fire retardant. Soluble polyborates, such as an alkali metal metaborate, or alkali metal polyborates $A_2O(B_2O_3)_x$ where A is an alkali metal and $x$ is a number from 4.16 to 7, such as sodium pentaborate, are preferably used with the chlorate in order to reduce or minimize this hazard. Any chlorate-diluent combinations can be used in admixture with the N-aryl urea.

Precautions can be taken to avoid segregation of the materials in the mixture by cocrystallizing two or more of the components so that they are present together in the crystals composing the composition. Preferred combinations are of a mixture of from 10 to 45% sodium or potassium chlorate cocrystallized with from 90 to 55% sodium or potassium pentaborate, and of a mixture of from 90 to 55% sodium or potassium metaborate cocrystallized with from 10 to 45% sodium or potassium chlorate, with the N-aryl urea present during the said cocrystallization so that it is incorporated in the crystals.

Thus, a particularly desirable combination in accordance with the invention is obtained by incorporating the N-aryl urea in a sodium pentaborate or metaborate and sodium chlorate mixture just before cocrystallization of the sodium pentaborate or metaborate with the sodium chlorate is completely effected.

The sodium metaborate can be prepared first from borax, caustic soda and water, using only the amount of water necessary (together with the water of crystallization in the borax and the water supplied by reaction with the caustic) to supply the water for the hydrated metaborate. Any of the following reactions can be used, depending upon the borate which is used as the starting material.

(I) $Na_2B_4O_7.5H_2O + 2NaOH + 10H_2O \rightarrow 2Na_2B_2O_4.8H_2O$
(II) $Na_2B_4O_7.5H_2O + 2NaOH + 2H_2O \rightarrow 2Na_2B_2O_4.4H_2O$
(III) $Na_2B_4O_7.2NaOH + 6H_2O \rightarrow$
$Na_2B_2O_4.4H_2O + Na_2B_2O_4.8H_2O$
(IV) $Na_2B_4O_7.10H_2O + 2NaOH + 5H_2O \rightarrow$
$2Na_2B_2O_4.8H_2O$
(V) $Na_2B_4O_7.2NaOH + 15H_2O \rightarrow 2Na_2B_2O_4.8H_2O$
(VI) $Na_2B_4O_7.10H_2O + 2NaOH + H_2O \rightarrow$
$Na_2B_2O_4.4H_2O + Na_2B_2O_4.8H_2O$
(VII) $2Na_2B_4O_7.10H_2O + Na_2B_4O_7.5H_2O + 6NaOH \rightarrow$
$5Na_2B_2O_4.4H_2O + Na_2B_2O_4.8H_2O$ The borax, alkali metal hydroxide and any additional water that is required in the process is placed in the mixture. The ingredients are agitated for a period up to several hours, using only room temperature without application of heat. The mixture goes through several phases and becomes a granular, friable product which is slightly moist. This occurs after a period of about 50 to 60 minutes' mixing at a temperature of about 70 to 80° F. The reaction mixture then is cooled by blowing cold air over it, and agitation and cooling is continued for from one and one-half to two and one-half hours until the batch is almost dry, but not dry enough to be dusty. At this stage the alkali metal chlorate, for example, sodium chlorate, is added, together with the N-aryl urea. At this point, the reaction mixture should be at a temperature within the range from 32 to 100° F. Cooling then is continued as soon as dusting due to the chlorate has ceased, and agitation is continued until the batch is dry, which usually requires from one-quarter to one-half hour.

The chlorate is extremely soluble and dissolves in the water present in the moist metaborate crystals. Thereafter, the chlorate and metaborate cocrystallize. In the final product, all of the chlorate which is present is cocrystallized with metaborate, and the N-aryl urea is uniformly dispersed throughout the crystalline mass.

A cocrystallized chlorate-pentaborate mixture can be prepared starting with sodium chlorate and borax. 35½ parts of commercial borax are dissolved in two gallons of boiling water, after which 34½ lbs. of 99½% powdered boric acid is added, followed by 45 lbs. of sodium chlorate. The quantities of borax and boric acid are sufficient to produce 55 lbs. of sodium pentaborate decahydrate. Heating is continued with agitation until the temperature reaches 268° F., after which heating is stopped and the mixture is agitated and rabbled until cold.

Alternatively, the sodium chlorate can be added after the temperature of the solution has reached 234° F., after which the mixture is rabbled until cold.

In each case the N-aryl urea can be added at this stage and rabbling continued until a dry-appearing cocrystallized product, friable and easily ground, is obtained. The yield is 100 lbs. of the cocrystallized pentaborate-chlorate mixture containing the desired amount of N-aryl urea.

Instead of evaporating and rabbling, the mixture can be spray dried.

It is not necessary, of course, that the N-aryl urea be added at exactly this stage of the process. It can be mixed with the cocrystallized metaborate-chlorate or pentaborate-chlorate. However, it is more difficult at this stage to obtain a uniform mixture in which segregation of the crystals does not occur on standing or shipping. Therefore, incorporating the N-aryl urea in the mass before complete cocrystallization is preferred.

It is not necessary to mix the N-aryl urea and the alkali metal chlorate in such a way that both are present in the same crystals, although this is a preferable method since it eliminates possible segregation of the materials and maintains uniformity. Powdered N-aryl urea and powdered chlorate or powdered cocrystallized chlorate-metaborate or chlorate-pentaborate can be mixed together and sold as such, or the two can be mixed in the aqueous medium and marketed in that form. When a polyborate diluent is to be used with the chlorate, such as a metaborate or a pentaborate, and application is in an aqueous medium, it is possible to utilize a combination of borax and boric acid in the amount stoichiometrically required to produce the desired polyborate. The borax and boric acid will react metathetically in the dispersion or solution to produce the polyborate, and when the solution dries the polyborate will be precipitated with the chlorate and the N-aryl urea.

Any convenient method of application of the composition of the invention to the infested area can be used. One method involves application of aqueous dispersions or solution of the composition, by spraying or otherwise. The dry powdered mix of N-aryl urea and chlorate also may be applied to the area to be treated, and here the N-aryl urea may or may not be present in the chlorate crystals. Any inert solid carrier or diluent can be incorporated therewith to facilitate application of small amounts to a given area. However, solution or dispersions in aqueous solvents generally are the most economical and most practical. Suitable compositions also are prepared by mixing or dispersing powdered N-aryl urea and chlorate with a nonsolvent organic liquid.

Herbicidal dusting compositions can be compounded to give homogeneous free-flowing solids by mixing the N-aryl urea and alkali metal chlorate with finely divided inert solid carriers, such as talcs, natural clays, pyrophyllite, diatomaceous earth, and flours such as walnut shell, wheat, redwood, soyabean and cottonseed flours. Other inert solid carriers which can be used include magnesium and calcium carbonates, calcium phosphates, lime, etc., either in powder or granular form. The herbicidal materials also can be combined with fertilizers or other materials which are useful for soil-modification purposes.

The percentage by weight of the essential active herbicidal ingredients in the inert solid and liquid carriers will vary according to the manner and rate in which the composition is to be applied. In general from about 0.5 to 95% by weight of the composition can be herbicidal components.

Aqueous herbicidal compositions contain the N-aryl urea homogeneously dispersed and the chlorate in solution. A surface-active wetting, dispersing or penetrating agent or emulsifying agent can be used to assist in preparing a stable dispersion of the urea, which is water-insoluble. Such agents are especially desirable when the composition is to be sprayed.

The surface-active wetting, dispersing and penetrating agents can be anionic, cationic or nonionic. Exemplary are the sodium and potassium oleates, morpholine and dimethylamine oleates, sulphonate animal and vegetable oils such as sulphonated fish and castor oils, petroleum sulphonates, sulphonated cyclic hydrocarbons, sodium lignin sulphonate, sodium alkylnaphthalene sulphonates, sodium salts of sulphonated condensation products of naphthalene and formaldehyde, sodium lauryl sulfate, disodium monolauryl phosphate, sorbitol laurate, pentaerythritol monostearate, glycerol monostearate, diglycol oleate, polyethylene oxides, stearyl polyoxyethylene alcohol, octylphenylpolyethylene oxide, polyvinyl alcohols, laurylamine hydrochloride, stearyl trimethyl quaternary ammonium bromide, lauryl pyridinium bromide, cetyl dimethyl benzyl quaternary ammonium chloride, and lauryl dimethylamine oxide. Generally, the surface-active agent will not comprise more than about 5 to 15% of the composition, and as little as 0.1% can be used beneficially.

There also may be incorporated in the herbicidal compositions of the invention oils and fats or similar vehicles such as cottonseed oil, olive oil, paraffin oil, hydrogenated vegetable oils, etc. Adhesives such as gelatin, blood albumin, rosin, alkyd resins and the like can be used to increase retention or tenacity of the deposits following application to the plants.

The following examples illustrate the preparation of a composition in accordance with the invention.

EXAMPLE 1

To 115 lbs. of water in a 200 gal. agitator-equipped mixer, warmed to between 130 and 140° F., is added 15 lbs. of silicate "N" and 270 lbs. of 50% aqueous sodium hydroxide. Agitation is started, and immediately 500 lbs. of octahedral borax pentahydrate is added. Agitation is continued for one hour, after which cooling air is directed across the mixture, and agitation is continued with cooling for one and one-half to two and one-half hours until the batch is almost dry but not dry enough to be dusty. At this stage the temperature is approximately 100° F. The cooling air is turned off and 592 lbs. of sodium chlorate is added, followed immediately by 18 lbs. of Telvar-W (80% 3-(p-chlorophenyl)-1,1-dimethyl urea). Cooling air again is turned on, and the agitation is continued with cooling until dusting stops. This usually requires from 15 to 30 minutes. The batch is dumped, and allowed to cure undisturbed for from 16 to 24 hours, after which the material is screened and ground as required and packed into containers. This composition contains 1.25% Telvar-W, which is 80% 3-(p-chlorophenyl)-1,1-dimethyl ureas. Thus, the total is 1.0% 3-(p-chlorophenyl)-1,1-dimethyl urea, 57% sodium metaborate $Na_2B_2O_4 \cdot 8H_2O$, 40% sodium chlorate, and about 2.0% inert ingredients.

EXAMPLE 2

A group of aqueous dispersions ranging from 0.0067 to 0.0466 lb./gal. of Telvar-W (80% 3-(p-chlorophenyl)-1,1-dimethyl urea) were made up, and applied at the rate of 300 gals./acre (the lbs./acre rate is indicated in Table I) to a group of test plots.

A quantity (1393 lbs.) of cocrystallized sodium chlorate-sodium metaborate was made up according to the procedure of Example 1 without however adding the Telvar-W. The mixer charge proportions were as follows: water, 115 lbs. silicate "N" 14 lbs., 50% liquid caustic soda, 270 lbs. $Na_2B_4O_7 \cdot 5H_2O$, 500 lbs., sodium chlorate, 580 lbs. This was dissolved in water to form a group of aqueous solutions ranging from 1.1% to 7.3% sodium chlorate, and these solutions applied at different rates (lbs./acre as stated in Table II below) on a group of test plots.

A third group of compositions was prepared by mixing the powdered Telvar-W with an aqueous cocrystallized sodium chlorate-sodium metaborate solution, prepared as above, and the resulting combined dispersions, which were compositions in accordance with the invention, were then applied to a group of test plots at the rates (lbs./acre) noted in Table III.

The test plots were covered with luxuriant growths of the weeds named. The soil during application was moist, and the weather was clear and cool. Observations of the results on weed control were made two and one-half months, nine and one-half months and fourteen months after application.

Table I 3-(p-CHLOROPHENYL)-1,1-DIMETHYL UREA ALONE

| Plot No. | A | B | C | D | E |
|---|---|---|---|---|---|
| Rate (lbs./acre) | 14 | 12 | 8 | 4 | 2 |
| Weeds: | | | | | |
| Beardless wild rye (Elymus triticoides) | x | | | | |
| Bull mallow (Malva nicaeensis) | | | | x | x |
| California poppy (Eschscholtzia californica) | | | | x | |
| Common foxtail (Hordeum murinum) | x | x | x | x | x |
| Darnel (Lolium temulentum) | x | x | x | x | x |
| Prickly lettuce (Lactuca scariola) | | | | x | x |
| White annual sweetclover (Melitotus alba) | | | x | | |
| White stem filaree (Erodium moschatum) | x | x | x | | |
| Wild morning glory (Convulvulus arvensis) | | x | x | | |
| Wild oats (Avena fatua) | x | x | x | x | x |
| Wild radish (Raphanus sativus) | | | | x | |
| Yellow annual sweetclover (Melitotus indica) | x | | | | |
| Yellow star thistle (Centurea solstitialis) | x | x | | x | x |
| Percent Control: | | | | | |
| After 2½ months | 99% | 100% | 98% | 35% | No control |
| After 9½ months | Very Good | Very Good | Fair | Very Poor | No control |
| After 14 months | Very Good | Very Good | Fair 50% | Very Poor | No control |

NOTES

After 2½ months

A=Sweetclover normal, filaree and wild oats definite injury, beardless wild rye slight injury but still growing.
B=Sweetclover normal, morning glory normal, wild oats, filaree and common barley severely injured.
C=Few wild oats are normal, sweetclover normal, morning glory normal.
D=Bull mallow, wild oats, wild radish, common foxtail, yellow star thistle, prickly lettuce, and California poppy—normal.
E=Almost perfect stand of common foxtail with some wild oats and all are normal and headed. Few yellow star thistle, bull mallow, and prickly lettuce appear normal. From the standpoint of change of plant species there was some control of the darnel and wild oats but from the standpoint of plant reduction the control is scored zero.

After 9½ months

A=Very good—few darnel and yellow star thistle seedlings started.
B=Very good—yellow star thistle and few darnel seedlings started.
C=Yellow star thistle, wild radish, filaree, California poppy, darnel seedlings started. Some annual white sweetclover, yellow star thistle, and one pigweed matured.
D=Yellow star thistle, darnel, California poppy, filaree, wild oat seedlings. Also dock, bull mallow and plantain are established and green. Many yellow star thistles matured. Also annual white sweetclover.
E=No comment.

After 14 months

A=Very good, almost complete control, 6 yellow star thistle, 2 clumps of alta fescule, 1 white stem filaree, 1 clump beardless wild rye.
B=Very good, almost complete control, 2 wild oats, 4 yellow star thistle, 2 filaree and a few morning glory plants present.
C=Only fair, about 50% control, yellow star thistle, buckhorn plantain, 6 wild oats and 1 California poppy growing.
D=Very poor, no evidence of control except some reduction in density of grasses but yellow star thistle has grown in where grass was thinned.
E=No control. Grasses very thick.

Table II

COCRYSTALLIZED SODIUM CHLORATE-SODIUM METABORATE ALONE (39.46% AQUEOUS SOLUTION)

| Plot No. | F | G | H | I | J |
|---|---|---|---|---|---|
| Rate (lbs./acre) | 495 | 424.45 | 276.4 | 141.5 | 70.5 |
| Weeds: | | | | | |
| Beardless wild rye (Elymus triticoides) | | x | | | |
| Bull mallow (Malva nicaeensis) | | | | | x |
| California poppy (Eschscholtzia californica) | | | x | | |
| Common foxtail (Hordeum murinum) | x | x | x | x | x |
| Curly dock (Rumex crispus) | | | x | | |
| Darnel (Lolium temulentum) | x | x | x | x | x |
| White stem filaree (Erodium moschatum) | x | x | x | | |
| Wild morning glory (Convulvulus arvensis) | x | | | | |
| Wild oats (Avena fatua) | x | x | x | x | x |
| Yellow star thistle (Centurea solstitialis) | x | x | x | x | |
| Percent Control: | | | | | |
| After 2½ months | 98% | 98% | 98% | 25% | No control |
| After 9½ months | Very Good | Fair | Fair | No control | No control |
| After 14 months | Poor | Poor | Poor | No control | No control |

NOTES

After 2½ months

F=Some grass scattered over the plot. Sweetclover has slight yellowish tinge, wild oats, darnel and morning glory showing injury.
G=Beardless wild rye—normal, wild oats and darnel severely injured—some grassy plants over entire plot.
H=California poppy some injury but blooming, darnel and wild oats some injury but headed, some young yellow star thistle that appears normal.
I=Yellow star thistle coming back strong.
J=All plants are normal.

After 9½ months

F=Very good—filaree, yellow star thistle and darnel seedlings started. On plot No. 2, 1 annual white sweet clover, 1 yellow star thistle and few alta fescue plants mature.
G=Fair—yellow star thistle, darnel and filaree seedlings started. The majority are darnel. On plot No. 8—5 yellow star thistle plants matured. 1 clump of beardless wild rye in plot.
H=Fair—yellow star thistle, darnel, and filaree seedlings started. Many yellow star thistles matured. Also, few pigweed and curly dock.
I=No control.
J=No control.

After 14 months

F=Looking poor, annual weeds and grasses coming back, annual grasses and broad-leaved weeds well established over the entire plot.
G=Poor, practically no control evident. Grasses very heavy.
H=No evidence of control.
I=No control evident, grasses very thick.
J=No control evident, grasses very thick.

Table III

3-(p-CHLOROPHENYL)-1,1-DIMETHYL UREA (80% CMU) AND COCRYSTALLIZED SODIUM CHLORATE–SODIUM METABORATE TOGETHER

| Plot No. | K | L | M | N | O | P | Q | R | S | T |
|---|---|---|---|---|---|---|---|---|---|---|
| Rate (lbs./acre): | | | | | | | | | | |
| Cocrystallized sodium chlorate-sodium metaborate | 424.45 | 353.5 | 353.5 | 276.4 | 212 | 212 | 141.5 | 141.5 | 141.5 | 70.5 |
| 3-(p-chlorophenyl)-1,1-dimethyl urea | 2 | 4 | 2 | 4 | 8 | 2 | 8 | 4 | 2 | 12 |
| Weeds: | | | | | | | | | | |
| Beardless wild rye (*Elymus triticoides*) | | | | | x | | | | | |
| Brome grass (*Bromus* spp.) | | | | | | x | | | | |
| California poppy (*Eschscholtzia californica*) | | | | x | | | | | | |
| Common foxtail (*Hordeum murinum*) | x | x | x | x | x | x | x | x | x | x |
| Curly dock (*Rumex crispus*) | | | | | | | x | x | | x |
| Darnel (*Lolium temulentum*) | x | x | x | x | x | x | x | x | x | x |
| White stem filaree (*Erodium moschatum*) | x | x | x | x | x | x | x | x | | x |
| Wild morning glory (*Convulvulus arvensis*) | x | | | | | | | x | | x |
| Wild oats (*Avena fatus*) | x | x | x | x | x | x | x | x | x | x |
| Yellow annual sweetclover) *Melilotus indica* | | | x | | x | | x | x | | |
| Yellow star thistle (*Centurea solstitialis*) | x | x | x | x | x | | | | x | x |
| Percent Control: | | | | | | | | | | |
| After 2½ months | 99% | 99% | 100% | 100% | 99% | 97% | 100% | 98% | 95% | 100% |
| After 9½ months | Very Good | Very Good | Very Good | Very Good | Good | Poor | Very Good | Good | Very Poor | Very Good |
| After 14 months | Poor, 5% | Fair, 50% | Poor, 5% | Fair, 50% | Fair, 40% | Poor (Almost no control) | Fair to Good, 75% | Fair to Poor, 30% | No Control | Very Good |

NOTES

After 2½ months

K = Morning glory coming up and looks normal, sweetclover showing definite yellowing, wild oats and darnel severely injured.
L = Sweetclover showing some yellowing, wild oats are severely injured.
M = Sweetclover showing a definite yellow—grasses are all but dead.
N = 3 California poppies—all yellowish but 1 in bloom.
O = Beardless wild rye—slight injury but still green, sweetclover slight yellowing.
P = Wild oats, darnel, brome grass injured but heading.
Q = Sweetclover slight yellowing, curly dock very yellow.
R = Morning glory, curly dock, sweetclover normal.
S = Common foxtail, darnel, wild oats, show some injury but are headed. Some yellow star thistle beginning to come up.
T = Curly dock normal, morning glory coming up and looks normal.

After 9½ months

K = California poppy, yellow star thistle, filaree and very few darnel seedlings started.
L = Yellow star thistle, California poppy, filaree seedlings started.
M = Darnel, yellow star thistle, and filaree seedlings started. 6 yellow star thistles matured.
N = Yellow star thistle, California poppy, filaree seedlings started. Yellow star thistle and California poppy very heavy due to seeding of 5 large yellow star thistles and 3 California poppy plants. The California poppies were reported at the first observation. There were no grassy seedlings showing.
O = Filaree, yellow star thistle, California poppy seedlings started. Several annual white sweet clover, 1 pigweed and 1 yellow star thistle matured.
P = Yellow star thistle, darnel and filaree seedlings started.
Q = Wild radish, yellow star thistle, filaree with very few darnel seedlings started.
R = Some yellow star thistle and darnel seedlings started. Some pigweed and yellow star thistle matured.
S = Yellow star thistle, wild oats, darnel, seedlings started. Bull mallow established and green. Many yellow star thistles matured.
T = Few wild radish, darnel, yellow star thistle seedlings started. 1 alta fescue, 2 curly dock, 3 small clumps of beardless wild rye and wild morning glory matured.

After 14 months

K = Poor, 5% control. Grasses well controlled, broad-leaved weeds are heavy. Majority of weeds are yellow star thistle and white stem filaree, a few California poppy and wild radish.
L = Fair, about 50% control. Grass control excellent, broad-leaved plants growing are mostly yellow star thistle, white stem filaree, prickly lettuce, alta fescue and wild oats.
M = Poor, 5% control. Grass control generally very good, mostly yellow star thistle, white stem filaree, a few wild oats and 1 clump beardless wild rye remain.
N = Fair, about 50% control. Grasses very well controlled, mostly yellow star thistle, some California poppy left and a few wild oats.
O = Fair, about 40% control. Grass control very good, some beardless wild rye, 6 wild oats, broad-leaved weeds are white stem filaree and yellow star thistle.
P = Poor, practically no control. Grasses and weeds both present. Yellow star thistle, wild oats, darnel and alta fescue.
Q = Fair to good, about 75% control. Yellow star thistle, white stem filaree and wild radish remain.
R = Fair to poor, 30% control. Grasses very well controlled. Only about 12 wild oats and 1 alta fescue plants remain. Broad-leaved weeds are yellow star thistle, white stem filaree, deadnettle and 8 wild radish remain.
S = Poor, no control evident. Grasses very thick.
T = Very good. No annuals present and a few plants of alta fescue, curly dock and morning glory present. Alta fescue seems somewhat resistant.

Table I shows that 3-(p-chlorophenyl)-1,1-dimethyl urea alone is not very effective against the leafy and deep-rooted plants such as sweetclover, morning glory and California poppy. It is effective against the grasses, wild oats, rye grass and plant species with growth habits as exemplified by filaree. However, relatively large rates of application are necessary, especially for good control after two and one-half months.

Table II shows that a minimum application of about 300 lbs. of chlorate-metaborate per acre is necessary in order to obtain effective control against the leafy and deep-rooted plants, such as California poppy, yellow star thistle, wild morning glory and darnel. The herbicide has only a short residual effect on the grasses, as exemplified by darnel. For a lasting effect of nine and one-half months and more an application of at least about 500 lbs. per acre is indicated. Little or no control was obtained using about 150 lbs. per acre and less. None of the rates used was adequate for fourteen months' control.

These results are to be compared with the results in Table III, obtained using compositions of the invention containing both the sodium chlorate-sodium metaborate and the 3-(p-chlorophenyl)-1,1-dimethyl urea. The enhanced effect of the two together on the percent control is well seen in a comparison of plots D (Table I), I (Table II) and R (Table III). Whereas 141 lbs. per acre of chlorate-metaborate alone (I) gave little or no control even of leafy and deep-rooted plants, and 4 pounds per acre of 3-(p-chlorophenyl)-1,1-dimethyl urea alone (D) gave little or no control of grasses, even for as little as two and one-half months, the two together (R) gave 95 to 98% control for nine and one-half months and fair control for fourteen months against grasses and leafy and deep-rooted plants. Similarly, D (Table I), H (Table II) and N (Table III) should be compared.

The enhanced effect on the amount of soil sterilant action is evident from a comparison of C. D and E (Table I), H and I (Table II) and N, Q and R (Table III). After nine and one-half and fourteen months, R is better than D and I, and also better than H and C, against grasses and leafy and deep-rooted plants, applied at one-half the rate of H and C. Compare also N and Q. It is hard to see why the two together at this rate should have a more lasting effect than either alone at twice the rate, since the duration of the sterilant action is usually thought of as a function of the rate of leaching of the herbicide. Nonetheless, the data show the effect to last better over a fourteen month period.

Plots K to P, inclusive, show the effect of more of each herbicide. K and M compared to P demonstrate that more chlorate-metaborate will compensate for small amounts of CMU. T shows that much more CMU will have the same effect. L, N and R, together, suggest that a minimum of 4 lbs. per acre of CMU is a good rate, and that at this rate there is not much to be gained by using more than about 150 lbs./acre of chlorate-metaborate.

From a cost standpoint, the compositions with more chlorate-metaborate and less 3-(p-chlorophenyl)-1,1-dimethyl urea would be preferred. For instance, the composition used in M would be cheaper than that of N, and gives as good a result for 9½ months. O and Q show that more than 8 lbs. per acre of CMU is not needed when only a 9½ month effect is desired, and T shows that 12 lbs. CMU per acre is desirable for a 14 month effect, when the chlorate is at least about 150 lbs. per acre. O, Q and T compared to L and N show that a better effect is obtained by increasing the CMU than by increasing the chlorate-metaborate.

We claim:

1. A plant growth control and herbicidal composition capable when applied in one application at a sufficient rate of imparting a long-lasting soil sterilant effect against the growth of grasses and deep-rooted and leafy plants enduring at least 9½ months, said composition comprising as the essential active ingredients an alkali metal chlorate and an amount within the range from about 0.5 to about 10% by weight of the active ingredients of an N-aryl urea compound having the formula

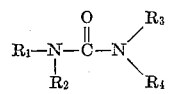

wherein R is an aromatic radical having from one to five substituents selected from the group consisting of hydrogen, halogen, a nitro group, alkyl groups having from one to eight carbon atoms and aromatic radicals, and $R_2$, $R_3$ and $R_4$ each are selected from the group consisting of hydrogen and aliphatic hydrocarbon radicals having from one to three carbon atoms, and not more than two of $R_2$, $R_3$ and $R_4$ is hydrogen, said herbicidal composition containing said admixture of said herbicidal compounds in a herbicidal concentration, said herbicidal compounds being mutually activating and producing a synergistic herbicidal effect, the effect of the chlorate against the growth of deep-rooted and leafy plants being synergized by the N-aryl urea compound, and the effect of the N-aryl urea compound against the growth of grasses being synergized by the chlorate to extend the duration of the effectiveness against grasses and deep-rooted and leafy plants over said period of at least 9½ months.

2. A herbicidal composition in accordance with claim 1 in which the chlorate is mixed with an alkali metal metaborate.

3. A herbicidal composition in accordance with claim 2 in which the chlorate and metaborate are cocrystallized with the N-aryl urea compound.

4. A composition in accordance with claim 1 in which the chlorate is mixed with an alkali metal polyborate $A_2O(B_2O_3)_x$ where A is an alkali metal and $x$ is a number from 4.16 to 7.

5. A composition in accordance with claim 1 in which the N-aryl urea compound is 3-(p-chlorophenyl)-1,1-dimethyl urea.

6. A composition in accordance with claim 1 in which the N-aryl urea compound is 3-(3,4-dichlorophenyl)-1,1-dimethyl urea.

7. A process of controlling the growth of grasses and deep-rooted and leafy plants in soil which comprises applying to the soil a composition in accordance with claim 1 in a sufficient amount to control the growth of said plants.

8. A process of controlling the growth of grasses and deep-rooted and leafy plants in soil which comprises applying to the soil an aqueous dispersion of a composition in accordance with claim 1 in a sufficient amount to control the growth of said plants.

9. A process of controlling the growth of grasses and deep-rooted and leafy plants in soil which comprises applying to the soil an aqueous dispersion of a dry powdered composition in accordance with claim 1 in a sufficient amount to control the growth of said plants.

10. A process of controlling the growth of grasses and deep-rooted and leafy plants in soil which comprises applying to the soil a composition in accordance with claim 2 in a sufficient amount to control the growth of said plants.

11. A process of controlling the growth of grasses and deep-rooted and leafy plants in soil which comprises applying to the soil a composition in accordance with claim 3 in a sufficient amount to control the growth of said plants.

12. A process of controlling the growth of grasses and deep-rooted and leafy plants in soil which comprises applying to the soil a composition in accordance with claim 4 in a sufficient amount to control the growth of said plants.

13. A process of controlling the growth of grasses and deep-rooted and leafy plants in soil which comprises applying to the soil a composition in accordance with claim 5 in a sufficient amount to control the growth of said plants.

14. A process of controlling the growth of grasses and deep-rooted and leafy plants in soil which comprises applying to the soil a composition in accordance with claim 6 in a sufficient amount to control the growth of said plants.

15. A plant growth control and herbicidal composition in accordance with claim 1 in the form of an aqueous solution.

16. A plant growth control and herbicidal composition in accordance with claim 1 in the form of a solid and incorporating an inert solid carrier, the alkali metal chlorate and N-aryl urea compound together constituting from about 0.5 to about 95% by weight of the composition.

References Cited in the file of this patent

UNITED STATES PATENTS

| | | |
|---|---|---|
| 2,700,604 | Knight | Jan. 25, 1955 |
| 2,709,648 | Ryker et al. | May 31, 1955 |

UNITED STATES PATENT OFFICE
CERTIFICATE OF CORRECTION

Patent No. 2,847,293 August 12, 1958

Linden E. Harris et al.

It is hereby certified that error appears in the printed specification of the above numbered patent requiring correction and that the said Letters Patent should read as corrected below.

Column 11, line 60, for "wherein R" read -- wherein $R_1$ --.

Signed and sealed this 4th day of November 1958.

(SEAL)
Attest:

KARL H. AXLINE
Attesting Officer

ROBERT C. WATSON
Commissioner of Patents